US012802501B2

(12) United States Patent
Nanjo

(10) Patent No.: US 12,802,501 B2
(45) Date of Patent: Nov. 17, 2026

(54) ENERGY PREDICTION APPARATUS

(71) Applicant: DENSO CORPORATION, Kariya-city (JP)

(72) Inventor: Hiroyuki Nanjo, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 53 days.

(21) Appl. No.: 18/885,965

(22) Filed: Sep. 16, 2024

(65) Prior Publication Data

US 2025/0095417 A1 Mar. 20, 2025

(30) Foreign Application Priority Data

Sep. 14, 2023 (JP) ................................ 2023-148989

(51) Int. Cl.
*G07C 5/04* (2006.01)
*B60W 40/00* (2006.01)

(52) U.S. Cl.
CPC ............... *G07C 5/04* (2013.01); *B60W 40/00* (2013.01)

(58) Field of Classification Search
CPC ....... G07C 5/04; B60L 2240/64; B60L 1/003; B60L 2210/40; B60L 50/51; B60L 2240/12; B60L 2240/26; B60L 2240/34; B60L 2240/642; B60L 2240/645; B60L 2240/66; B60L 2240/662; B60L 2240/68; B60L 2260/50; B60L 2260/54; G01C 21/3469; B60W 40/00; B60W 40/04; B60W 40/06; B60W 40/105; B60W 50/0097; B60W 2520/00
See application file for complete search history.

(56) References Cited

U.S. PATENT DOCUMENTS

| | | | | |
|---|---|---|---|---|
| 2011/0060517 | A1 | 3/2011 | Kono et al. | |
| 2016/0245662 | A1* | 8/2016 | Rajagopalan | G01C 21/3469 |
| 2022/0214691 | A1* | 7/2022 | Nagata | G01C 21/3469 |
| 2022/0252416 | A1* | 8/2022 | Wu | G01C 21/3492 |
| 2023/0382404 | A1* | 11/2023 | Nanjo | B60W 40/105 |
| 2024/0192003 | A1* | 6/2024 | Nanjo | B60L 58/13 |
| 2024/0377210 | A1* | 11/2024 | Kishita | G01C 21/3446 |
| 2025/0296588 | A1* | 9/2025 | Zahid | B60W 50/14 |

* cited by examiner

*Primary Examiner* — Robert T Nguyen
(74) *Attorney, Agent, or Firm* — Oliff PLC

(57) ABSTRACT

An energy prediction apparatus is provided with a pattern storing unit that stores a plurality of vehicle speed patterns as an evaluation pattern, corresponding to an evaluation-purpose traffic information as information related to traffic where a vehicle travels; a route acquiring unit that acquires a travelling route where an object vehicle travels for which energy consumption is to be predicted; an information acquiring unit that acquires an object traffic information related to a traffic where the object vehicle travels on the travelling route; a pattern acquiring unit that acquires an evaluation pattern corresponding to the object traffic information from the plurality of evaluation patterns stored in the pattern storing unit; and an energy prediction unit that predicts an energy consumption where the object vehicle travels on the travelling route using the evaluation pattern acquired by the pattern acquiring unit.

5 Claims, 10 Drawing Sheets

| AVERAGE VEHICLE SPEED v_ave | EVALUATION VEHICLE SPEED PATTERN v_test | |
|---|---|---|
| v0 | S0 |   |
| v1 | S1 |   |
| ⋮ | ⋮ | ⋮ |

| AVERAGE VEHICLE SPEED v_ave | NUMBER OF SIGNALS | EVALUATION VEHICLE SPEED PATTERN v_test | |
|---|---|---|---|
| v0 | 0～10 | s0 |  |
| | 11～20 | s1 |  |
| | ⋮ | ⋮ | ⋮ |
| v1 | 0～10 | s10 |  |
| | 11～20 | s11 |  |
| | ⋮ | ⋮ | ⋮ |
| ⋮ | ⋮ | ⋮ | ⋮ |

ENERGY PREDICTION APPARATUS

CROSS-REFERENCE TO RELATED APPLICATION

This application is based on and claims the benefit of priority from earlier Japanese Patent Application No. 2023-148989 filed Sep. 14, 2023, the description of which is incorporated herein by reference.

BACKGROUND

Technical Field

The present disclosure relates to an energy prediction apparatus.

Description of the Related Art

A technique for predicting an energy consumption of a vehicle is known. For example, a technique is disclosed for predicting an energy consumption of a vehicle using a mode-travelling fuel efficiency. According to this technique, an amount of energy consumption for each road link is calculated considering the mode-travelling fuel efficiency and other information.

SUMMARY

The present disclosure provides an energy prediction apparatus including a pattern prediction unit that stores a plurality of vehicle speed patterns as an evaluation pattern, corresponding to an evaluation-purpose traffic information as information related to traffic where a vehicle travels; a route acquiring unit that acquires a travelling route where an object vehicle travels for which energy consumption is to be predicted; an information acquiring unit that acquires an object traffic information related to a traffic where the object vehicle travels on the travelling route; a pattern acquiring unit that acquires an evaluation pattern corresponding to the object traffic information from the plurality of evaluation patterns stored in the pattern storing unit; and an energy prediction unit that predicts an energy consumption where the object vehicle travels on the travelling route using the evaluation pattern acquired by the pattern acquiring unit.

DETAILED DESCRIPTION OF THE PREFERRED EMBODIMENTS

Figure 1:
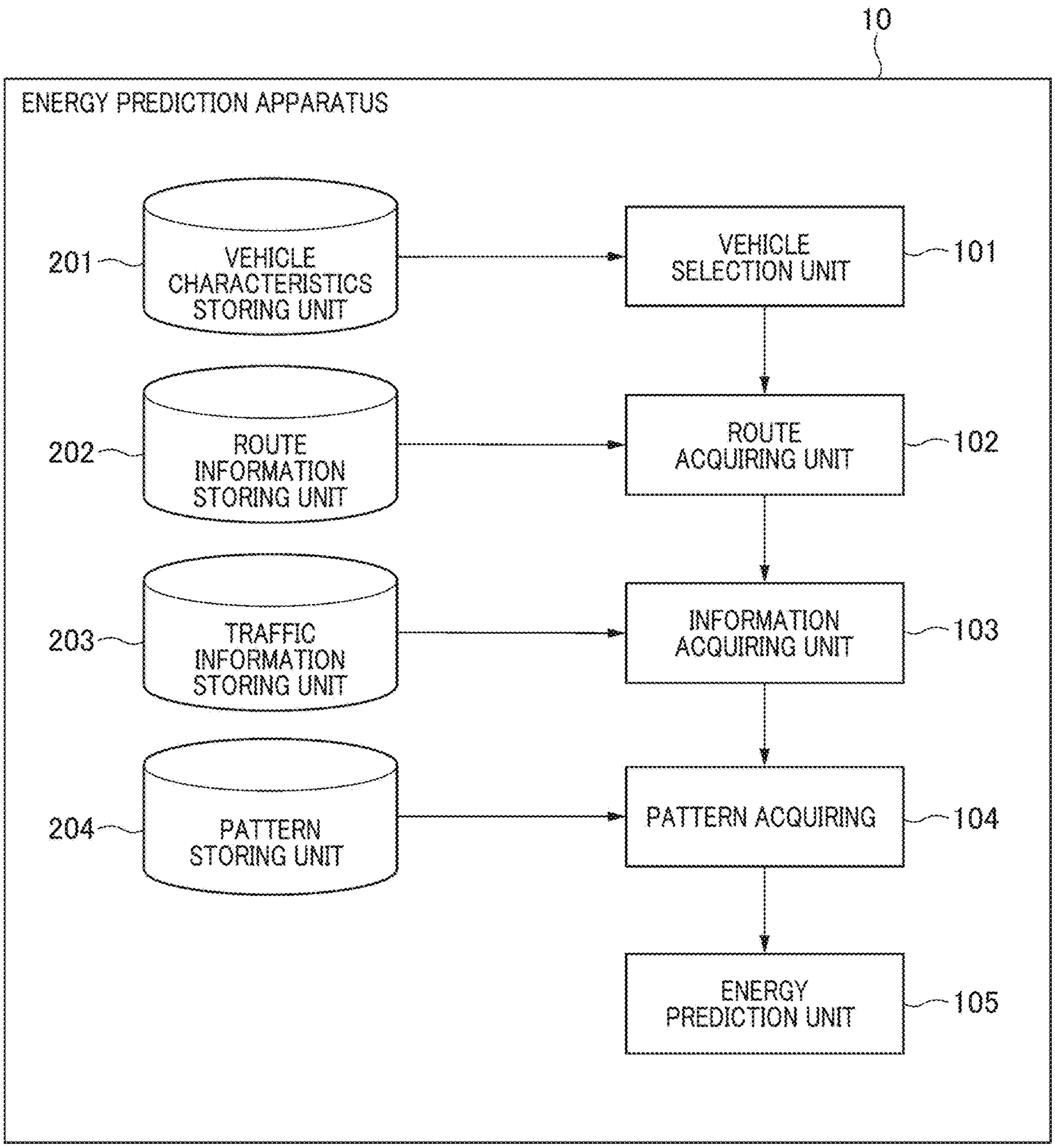
FIG. 1 is a block diagram showing a configuration of an energy prediction apparatus according to a present embodiment.

A technique for predicting an energy consumption of a vehicle is known. For example, a technique is disclosed for predicting an energy consumption of a vehicle using a mode-travelling fuel efficiency. Specifically, a patent literature, JP-A-2011-53162 discloses a technique for predicting an energy consumption of a vehicle using a mode-travelling fuel efficiency.

According to this technique, an amount of energy consumption for each road link is calculated considering the mode-travelling fuel efficiency and other information.

In the above-mentioned patent literature, the user selects a mode-travelling fuel efficiency as vehicle-characteristics and an amount of energy consumption is calculated using the selected mode-travelling fuel efficiency. However, the mode-travelling fuel efficiency selected by the user may not be an optimized value for calculating the amount of energy consumption. Hence, any other method may preferably be utilized for improving an accuracy for predicting the amount of energy consumption.

Hereinafter, with reference to accompanying drawings, embodiments of the present disclosure will be described. In order to facilitate understating of the explanation, the same reference symbols are applied to the same constituents in the drawings and redundant explanation will be omitted.

FIG. 1 is an explanatory diagram showing functional constituents of an energy prediction apparatus 10 according to the present embodiment. As shown in FIG. 1, the energy prediction apparatus 10 is provided with a vehicle selection unit 101, a route acquiring unit 102 and an information acquiring unit 103, a pattern acquiring unit 104, an energy prediction unit 105, a vehicle-characteristics storing unit 201, a route information storing unit 202, a traffic information storing unit 203 and a pattern storing unit 204. The energy prediction apparatus 10 is a computer system provided with a CPU, a memory unit (ROM, RAM and the like), a communication interface and the like as a hardware configuration. The energy prediction apparatus 10 can be achieved by executing a program stored in a non-transitory tangible recording media such as ROM. Note that the energy prediction apparatus 10 can be also achieved not only by executing a program (software) but also by a combination of hardware devices (electrical circuits) or a combination of the hardware devices and the software.

The vehicle-characteristics storing unit 201 is configured to store vehicle characteristics information used for calculating an energy consumption for each vehicle or each vehicle type. As the characteristic information used for calculating the energy consumption, a gross vehicle weight, an air resistant coefficient, a frontal projected area and a rolling resistance coefficient are included.

The route information storing unit 202 stores information about a route from any departure point to any destination point. The information about the route includes information of a distance and an inclination and the like.

The traffic information storing unit 203 stores information about traffic on the route. The information about the traffic of the route includes characteristic information of a vehicle speed on the route, characteristic information of a traffic flow on the route, characteristic information on the route, characteristic information of an area surrounding the route, characteristic information of the destination and characteristic information of the weather on the route.

The characteristic information of the vehicle speed on the route includes an average vehicle speed, an average frequency of accelerations and decelerations and an average number of times of vehicle stops. The characteristic information of the traffic flow on the route includes a traffic-flow quantity and a legal speed limit. The characteristic information of the route includes information such as the number of signals on the route, the number of temporally stops on the route, an average number of traffic lanes on the route, the number of railroad-crossings on the route, the number of left and right turns on the road, information of a lane regulation and under-construction on the road, an inclination angle on the route and a curvature of a curved road on the route.

The characteristic information of an area surrounding the route includes information about popular shops existing in an area surrounding the route, information about schools existing in an area surrounding the route, an average age of drivers living in an area surrounding the route, the number of commuters living in an area surrounding the route and information of whether the surrounding area of the route is a business district or a satellite town for commuters. The characteristic information about the destination includes the number of delivery points when requiring a parcel delivery and bus-stops included in the route.

The pattern storing unit 204 stores a plurality of vehicle speed patterns, as an evaluation pattern, corresponding to an evaluation-purpose traffic information as the information related to a traffic where the vehicle travels. The evaluation-purpose traffic information is set corresponding to the traffic information of the route stored in the traffic information storing unit 203. Accordingly, the evaluation-purpose traffic information includes characteristic information of a vehicle speed on the route, characteristic information of a traffic flow on the route, characteristic information on the route, characteristic information of an area surrounding the route, characteristic information of the destination and characteristic information of the weather on the route.

The vehicle selection unit 101 selects a vehicle as an object for predicting energy consumption and acquires characteristic information related to the selected vehicle from the vehicle characteristics storing unit 201.

The route acquiring unit 102 sets a traveling route to be an object of the energy consumption prediction. The route acquiring unit 102 sets, when a plurality of different routes are present for a route from the departure point to the destination point, respective routes to be route candidates, and acquires route information for each route candidate from the route information storing unit 202.

The information acquiring unit 103 acquires, from the traffic information storing unit 203, object traffic information related to a traffic on a route set by the route acquiring unit 102. The object traffic information acquired by the information acquiring unit 103 may be acquired from a service organization that provides traffic information.

The pattern acquiring unit 104 acquires an evaluation pattern as a vehicle speed pattern corresponding to the object traffic information acquired by the information acquiring unit 103. The pattern acquiring unit 104 acquires an evaluation pattern corresponding to the object traffic information from the plurality of evaluation patterns stored in the pattern storing unit 204.

Figure 2:
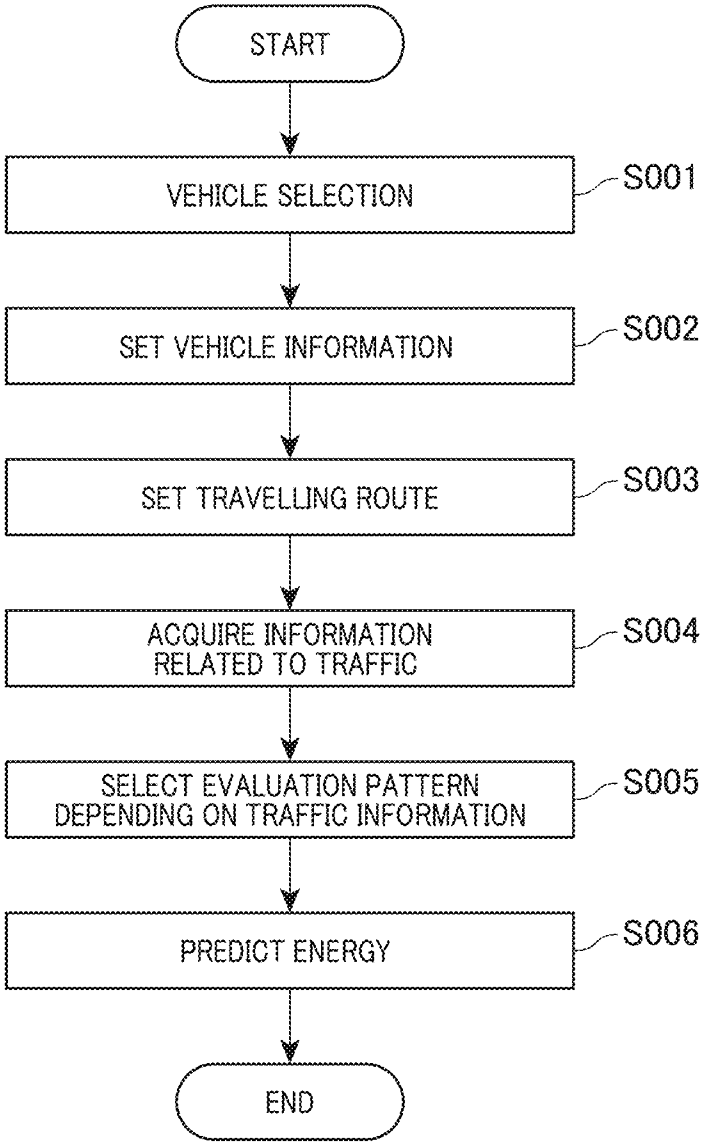
FIG. 2 is a flow chart showing information an processing flow using an energy prediction apparatus shown in FIG. 1.

The energy prediction unit 105 predicts energy consumption where the object vehicle travels on the traveling route using the evaluation pattern acquired by the pattern acquiring unit 104. The energy prediction unit 105 generates a vehicle speed pattern on the travelling route using the evaluation pattern, thereby predicting the energy consumption Subsequently, with reference to FIG. 2, information processing flow processed by the energy prediction apparatus 10 will be described. At step S001, the vehicle selection unit 101 selects an object vehicle for predicting the energy consumption. The object vehicle may be selected in response to a user-input operation.

At step S002 subsequent to step S001, the vehicle selection unit 101 sets vehicle information of the object vehicle. The vehicle information is used to calculate the energy consumption. As the vehicle information, a gross vehicle weight, an air resistant coefficient, a frontal projected area and a rolling resistance coefficient are included. The vehicle selection unit 101 acquires vehicle information from the information stored in the vehicle-characteristics storing unit 201.

At step S003 subsequent to step S002, the route acquiring unit 102 sets a travelling route as an object for predicting the energy consumption. In the case where a plurality of traveling routes are assumed to the destination, the route acquiring unit 102 sets a plurality of travelling routes R(i), where i is natural number from 1 to n. The route acquiring unit 102 defines respective travelling routes R(i) to be L(i).

At step S004 subsequent to step S003, the information acquiring unit 103 acquires the object traffic information I(i) related to a traffic of the travelling route R(i) set by the information acquiring unit 103 at step S003. The object traffic information I(i) is stored in the traffic information storing unit 203. The object traffic information I(i) may be acquired by a traffic information service provider. As described above, the information about the traffic of the route includes characteristic information of a vehicle speed on the route, characteristic information of a traffic flow on the route, characteristic information on the route, characteristic information of an area surrounding the route, characteristic information of the destination and characteristic information of the weather on the route. According to the present embodiment, a case will be described in which the object traffic information I(i) is an average vehicle speed v_ave(i) as an example.

At step S005 subsequent to step S004, the pattern acquiring unit 104 selects an evaluation pattern V_test(i) depending on the object traffic information I(i). The evaluation pattern V_test(i) is stored in the pattern storing unit 204 being correlated to the object traffic information I(i).

Figure 3:
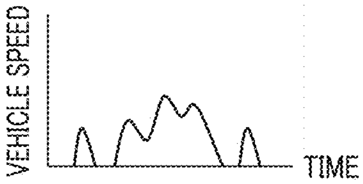
FIG. 3 is a table showing an example of a relationship between an average vehicle speed and an evaluation pattern.
Figure 3:
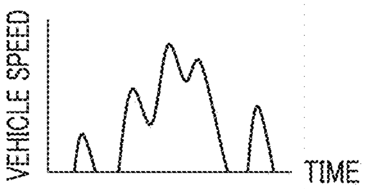
Figure 4:
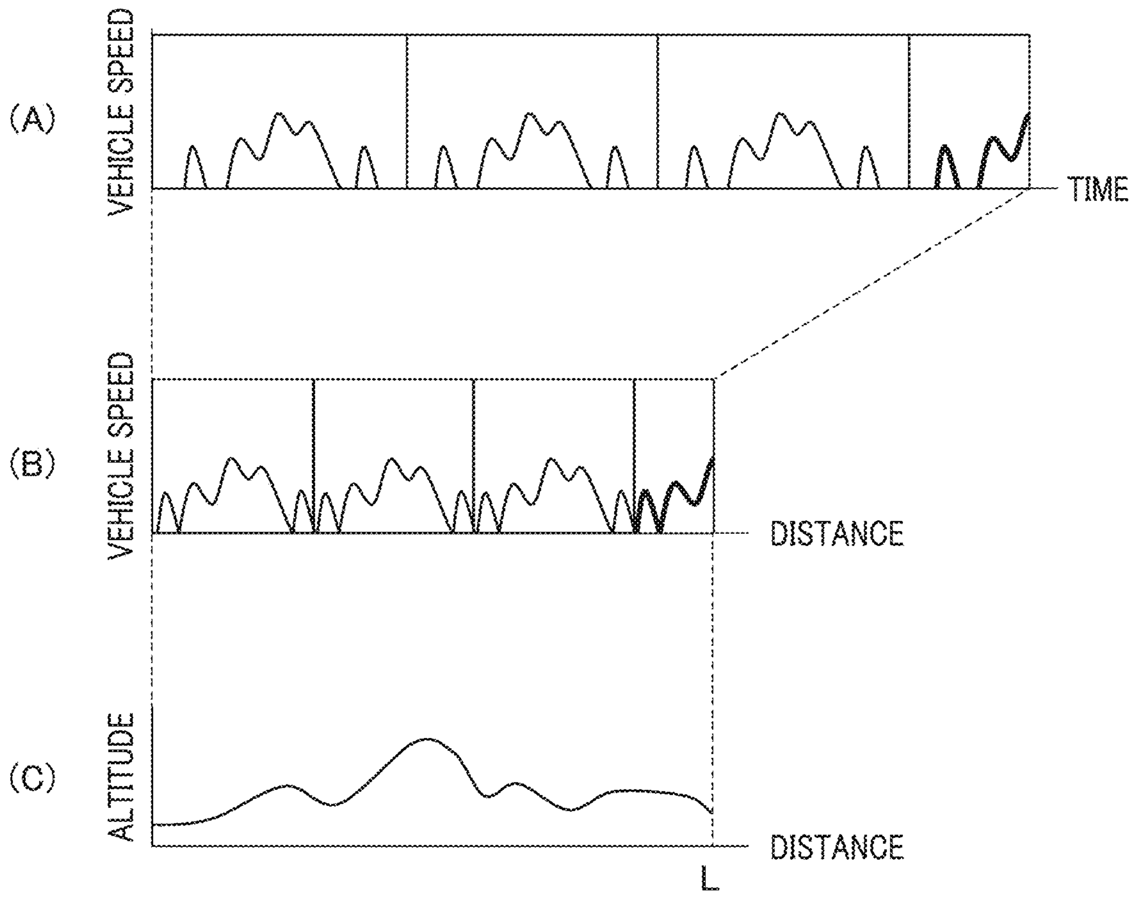
FIG. 4 is a graph showing an example of a process for calculating a vehicle speed changing pattern using the evaluation pattern.

With reference to FIG. 3, an example of the information stored in the pattern storing unit 204 will be described. In the example shown in FIG. 3, an evaluation pattern v_test is stored corresponding to the average vehicle speed v_ave. When the average vehicle speed v_ave is 'v0', 'S0' is selected for the evaluation pattern v_test.

At step S006 subsequent to step S005, the energy prediction unit 105 predicts an energy consumption when the object vehicle travels on the travelling route R(i). The energy prediction unit 105 uses the evaluation pattern v_test selected at step S005 to generate the vehicle speed pattern for the entire travelling route R(i)

As shown in FIG. 5(A), the process repeats the evaluation pattern v_test(i) until completing entire route of the travelling route R(i). Since the horizontal axis of FIG. 5(A) indicates a time, the horizontal axis of FIG. 5(A) is converted to be a distance axis as shown in FIG. 5(B), and data corresponding to the distance L(i) of the travelling route R(i) is acquired. As shown in FIG. 5(C), the process calculates an inclination information of the travelling route R(i) based on altitudes of positional coordinates when travelling the travelling route R(i) with the generated vehicle speed pattern. The information of the altitudes of positional coordinates is stored in the route information storing unit 202. The information of altitudes of the positional coordinates may be acquired from a service organization that provides this information.

Next, a calculation process of the energy prediction unit 105 after completing the generation of the vehicle speed pattern will be described.

A travelling resistance Fdrv(t) is calculated using the following formula (f01).

$$Fdrv(t) = Wa(t) + 0.5*\rho*C_d*A_V2(t) + \mu W_g + W_g \sin\theta(t), \quad \text{(f01)}$$

where t=time, W=gross vehicle weight, a(t)=acceleration factor at time t, ρ=air density, $C_d$=air resistance coefficient, A=frontal projected area, v(t)=velocity at time t, μ=rolling resistance coefficient, g=gravitational acceleration and θ(t) =slope between a point at time t and a point at time t−1.

The air density p may be set to be a fixed value 1.293 kg/m$^3$. The air density ρ may be calculated from the air temperature. The gravitational acceleration g may be a fixed value 9.8 m/s$^2$. The slope θ(t) may be calculated from latitudes/longitudes information and altitudes information. Note that information related to the travelling route R(i) is stored in the route information storing unit 202. For the vehicle parameter, information stored in the vehicle-characteristics storing unit 201 is read. For example, the following values are used.

W: 2,000 kg $C_d$: 0.3

A: 5 m$^2$

μ: 0.1

The travelling horsepower Pdrv (t) is calculated using the following formula (f02).

$$Pdrv(t) = Fdrv(t)*v(t) \quad \text{(f02)}$$

Figure 5:
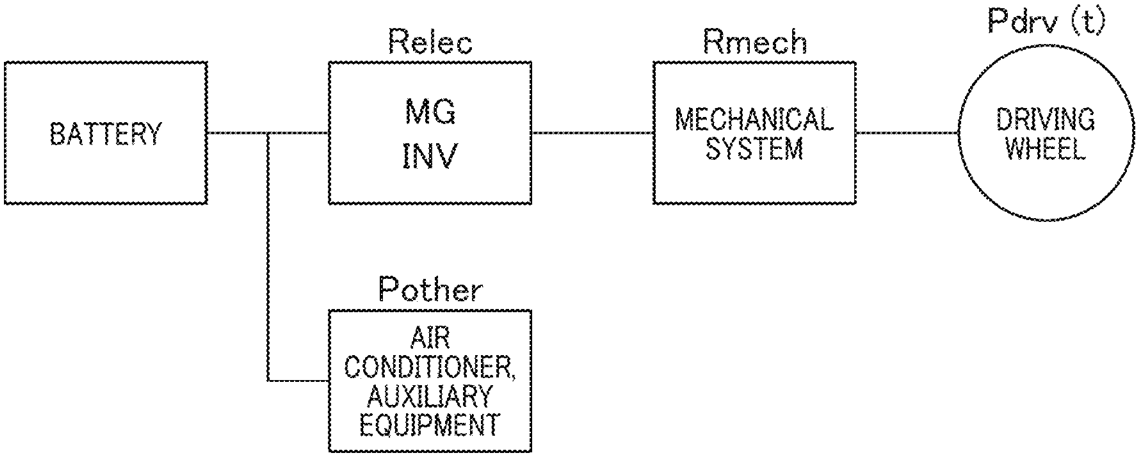
FIG. 5 is an explanatory diagram showing an energy prediction in an electric vehicle.

FIG. 5 shows an example of a system for an electric vehicle. According to the system exemplified in FIG. 5, a system efficiency of an electrical system (MG-INV) is referred to as Relec and a system efficiency of a mechanical system is referred to as Rmech. For the mechanical system efficiency Rmech, a fixed value such as 70% may be used. The mechanical system efficiency Rmech indicates that an energy inputted to the mechanical system is transmitted to the driving wheels at the efficiency Rmech, and the travelling horsepower Pdrv (t) is generated. Accordingly, an energy P'drv (t) inputted to the mechanical system is calculated with the following formula (f03).

$$P'drv(t) = Pdrv(t)/Rmech \quad \text{(f03)}$$

Figure 6:
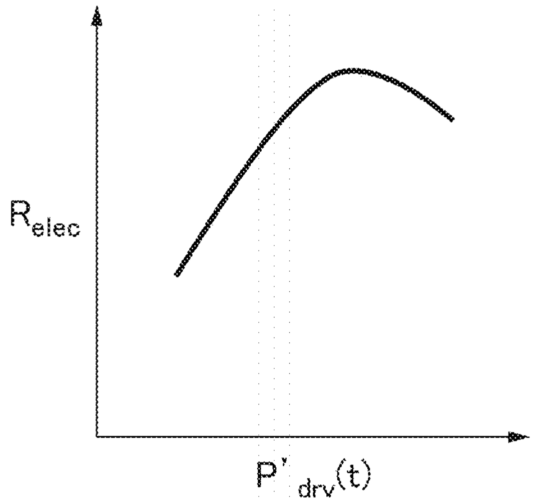
FIG. 6 is a graph showing an example of an efficiency of an electrical system in an energy prediction.

The electrical system efficiency Relec is a function of an energy inputted to the mechanical system from the electrical system, and is defined in a manner exemplified in FIG. 6, for example. The electrical system efficiency Relec is a function of the energy P'drv (t) inputted to the mechanical system and is calculated with the following formula (f04).

A unit of power P"drv(t) for travelling is calculated with the following formula (f05).

$$P''drv(t) = P'drv(t)/Relec(P'drv(t)) \quad \text{(f05)}$$

In the case where the formula (f05) is accumulated until time t, a travelling energy Edrv_prd_base is calculated by the following formula (f06). Note that the travelling energy is stored into a battery as a regeneration energy when P"drv (t) is smaller than 0 (i.e. P"drv (t)<0).

$$\text{Edrv\_prd\_base} = \sum(P''drv(t)*(t-(t-1))) \quad \text{(f06)}$$

The unit of power of an air conditioner or a driving source of auxiliary equipment is defined as Pother (t). The Pother (t) may be set to be a fixed value such as 5 kW. When accumulating the Pother (t) until time t, an out-travelling energy Eother_prd_base is calculated with the following formula (f07).

$$\text{Eother\_prd\_base} = \sum(Pother(t)*(t-(t-1))) \quad \text{(f07)}$$

An amount of gross energy until time t using the formulas (f06) and (f07) is calculated with the following formula (f08).

$$\text{Etotal\_prd\_base}(t) = \text{Edrv\_prd\_base}(t) + \text{Eother\_prd\_base}(t) \quad \text{(f08)}$$

Figure 7:
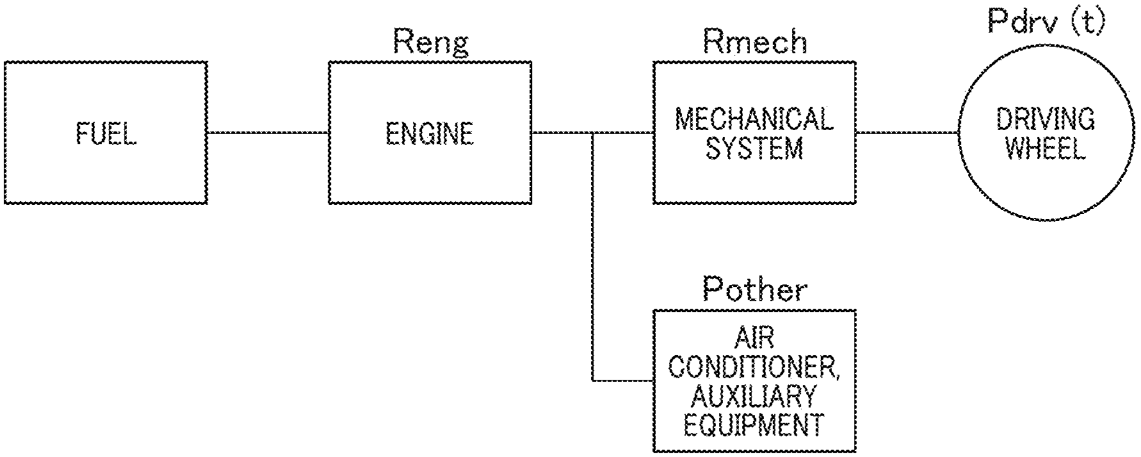
FIG. 7 is a diagram showing an example of an engine efficiency in an energy prediction for a vehicle having internal combustion engine.

The configuration disclosed in the present embodiment can be applied to not only electric vehicles but vehicles provided with internal combustion engines. FIG. 7 shows an example of a system for a vehicle provided with an internal combustion engine. According to the system exemplified in FIG. 7, the engine efficient is defined as Reng and a mechanical efficiency is defined as Rmech. For the mechanical efficiency Rmech, a fixed value such as 70% can be used. The mechanical system efficiency Rmech indicates that an energy inputted to the mechanical system is transmitted to the driving wheels at the efficiency Rmech, and the travelling horsepower Pdrv (t) is generated. Accordingly, the energy P'drv (t) inputted to the mechanical system is calculated with the following formula (f09).

$$P'drv(t) = Pdrv(t)/R\text{mesh}. \quad \text{(f09)}$$

The engine supplies an energy for driving an air conditioner or an auxiliary equipment in addition to a travelling energy. An energy necessary for driving the air conditioner or the auxiliary equipment is defined as Pother (t). Pother (t) may be a fixed value such as 5 kW.

Figure 8:
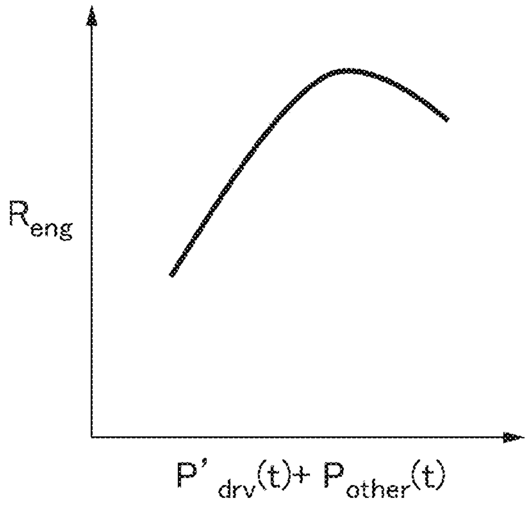
FIG. 8 is a graph showing an example of an engine efficiency in an energy prediction.

An engine efficiency Reng is a function between an input energy inputted to the mechanical system from the engine and an energy for driving the auxiliary equipment. The engine efficiency Reng is defined in a manner shown in FIG. 8, for example. The engine efficiency Reng is a function of P'drv (t)+Pother (t), and is calculated using the following formula (f10).

$$Reng = g\,(P'drv\,(t) - P\text{other}\,(t)) \tag{f10}$$

With the formula (f09) together with the formula (f10), an amount of gross energy is calculated using the following formulas (f11) and (f12).

$$P\text{sum} = \ (t) = P'drv\,(t) + P\text{other}\,(t) \tag{f11}$$

$$P'\text{sum}\,(t) = P\text{sum}\,(t)/Reng\,(P\text{sum}\,(t)) \tag{f12}$$

Since the vehicle provided with an internal combustion engine does not utilize a regeneration energy, only positive values are considered.

$$P''\text{sum}\,(t) = P'\,\text{sum}\,(t)\,(P'\text{sum}\,(t) > 0 \tag{f13}$$

P"sum (t) is accumulated with time and required amount of energy Etotal_prd_base is calculated using the following formula (f14).

In the above description, the travelling route is defined as one section. However, the travelling route may be divided into a plurality of sections and energy consumption may be predicted using information related to a traffic adapted for the divided sections.

Figure 9:
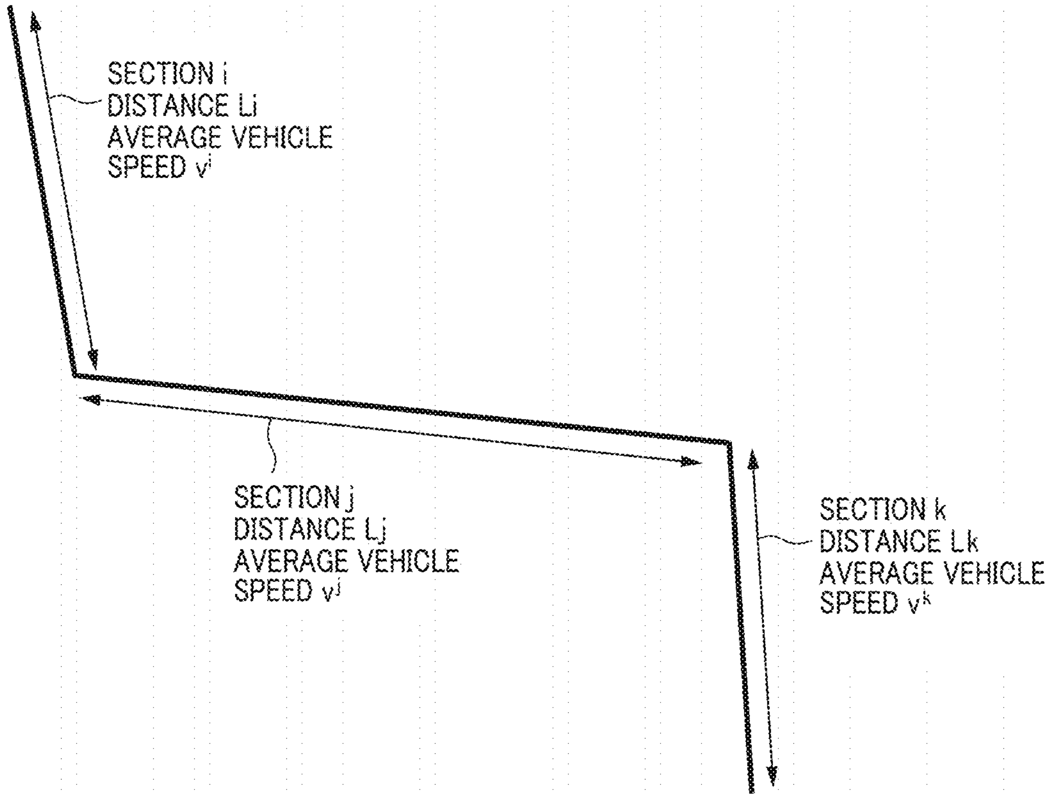
FIG. 9 is a diagram showing an example of a travelling route divided into a plurality of sections.

In an example shown in FIG. 9, the travelling route is divided into a section i, a section j and a section k. The distance and the average travelling speed in each section is: a distance Li and an average traveling speed vi for the section i; a distance Lj and an average traveling speed vj for the section j; and a distance Lk and an average travelling speed vk for the section k.

Figure 10:
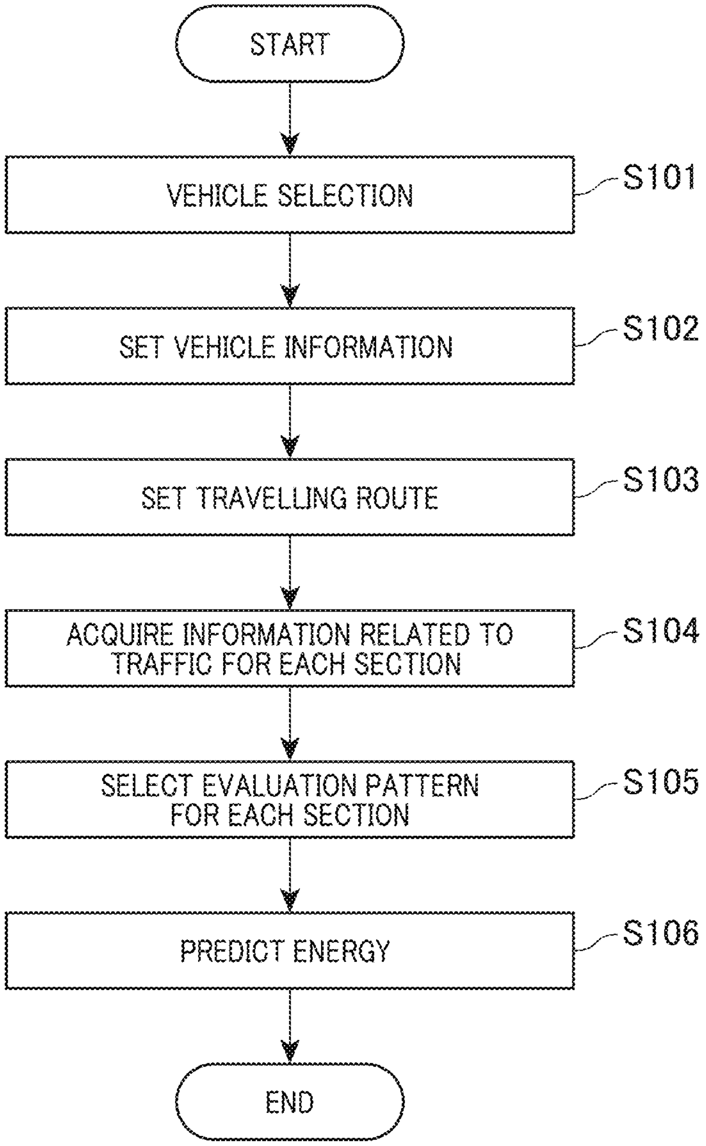
FIG. 10 is a flowchart showing information processing flow in the case where a travelling route is divided into a plurality of sections.

With reference to FIG. 10, information processing flow processed by the energy prediction apparatus 10 in the case where the travelling route is divided into sections will be described. At step S101, the vehicle selection unit 101 selects an object vehicle for predicting the energy consumption. The object vehicle may be selected in accordance with a user input.

At step S102 subsequent to step S101, the vehicle selection unit 101 sets the vehicle information of the object vehicle. The vehicle information is used when calculating the energy consumption. The vehicle information includes a gross vehicle weight, an air resistant coefficient, a frontal projected area and a rolling resistance coefficient. The vehicle selection unit 101 acquires vehicle information from the information stored in the vehicle-characteristics storing unit 201.

At step S103 subsequent to step S102, the route acquiring unit 102 sets the travelling route as an object for predicting the energy consumption. In the case where a plurality of traveling routes are assumed to the destination, the route acquiring unit 102 sets a plurality of travelling routes. Note that one travelling route is set in this description in order to explain the divided sections in detail. The route acquiring unit 102 divides the travelling route into the section i, the section j and the section k.

At step S104 subsequent to step S103, the information acquiring unit 103 acquires object traffic information related to a travelling route set at step S103. The object traffic information is stored in the traffic information storing unit 203. The object traffic information may be acquired by a traffic information service provider. As described above, the information about the traffic of the route includes characteristic information of a vehicle speed on the route, characteristic information of a traffic flow on the route, characteristic information on the route, characteristic information of an area surrounding the route, characteristic information of the destination and characteristic information of the weather on the route. In the description of the present embodiment, a case will be exemplified in which the object traffic information is an average vehicle speed.

As described with reference to FIG. 9, the travelling route is divided into the section i, the section j and the section k. The distance and the average travelling speed in each section is: a distance Li and an average traveling speed vi for the section i; a distance Lj and an average traveling speed vj for the section j; and a distance Lk and an average travelling speed vk for the section k.

At step S105 subsequent to step S104, the pattern acquiring unit 104 selects an evaluation pattern V_test(i) based on the object traffic information. The evaluation pattern v_test is stored in the pattern storing unit 204 corresponding to the object traffic information.

As described with reference to FIG. 3, the evaluation pattern v_test is stored corresponding to the average vehicle speed v_ave. When the average vehicle speed v_ave is 'v', 'S0' is selected for the evaluation pattern v_test. Hence, according to the present example, an evaluation pattern v_test corresponding to the average vehicle speed vi, vj and vk is selected. Note that the evaluation patterns corresponding to the average vehicle speed vi, vj and vk are defined as evaluation patterns v_test_i. v_test_j and v_test_k, respectively.

At step S106 subsequent to step S105, the energy prediction unit 105 predicts an energy consumption of an object vehicle when travelling on the travelling route. The energy prediction unit 104 uses the evaluation patterns v_test_i, v_test_j and v_test_k which are selected at step S005, thereby generating vehicle speed patterns for the entire traveling route.

Figure 11:
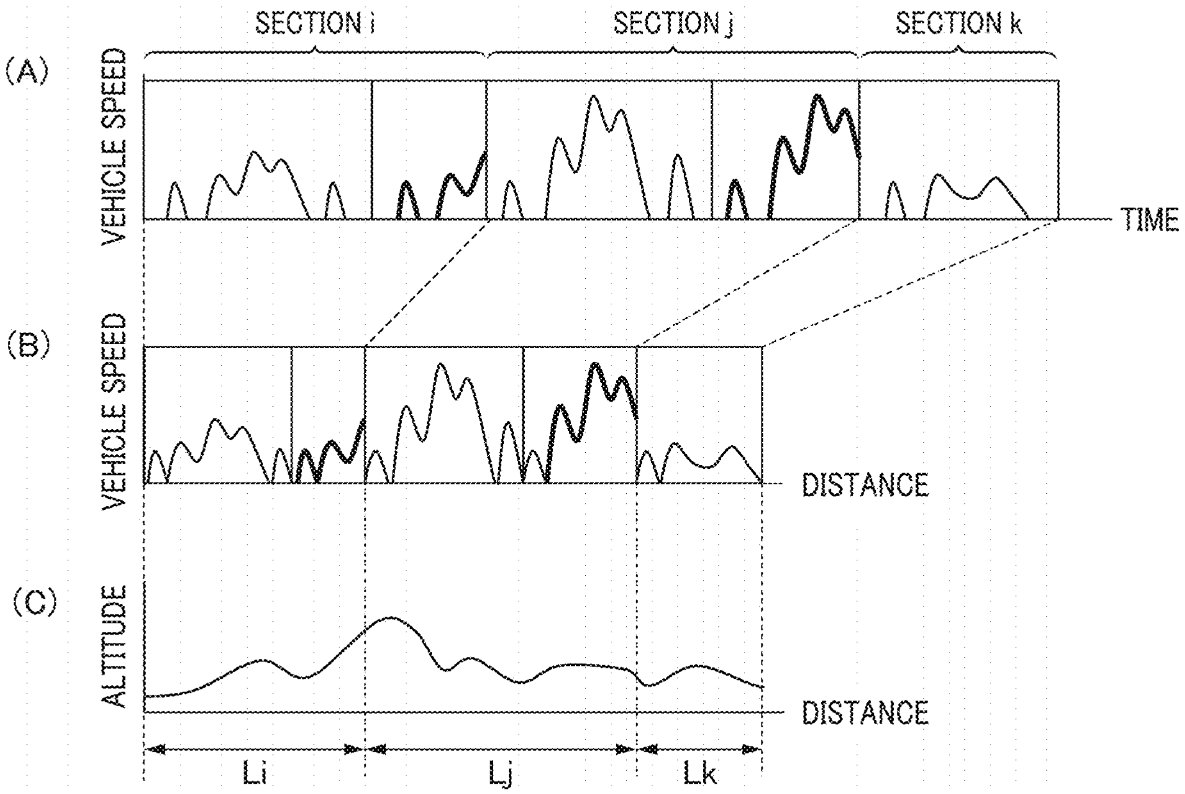
FIG. 11 is a graph showing an example for calculating a vehicle speed changing pattern from an evaluation pattern in the case where the travelling route is divided into a plurality of sections.

As shown in FIG. 11(A), the process repeats the evaluation patterns v_test_i, v_test_j and v_test_k until completing entire travelling route. More specifically, the process repeats the evaluation pattern v_test_i until completing the entire section i of the travelling route. Similarly, the process repeats the evaluation pattern v_test_j until completing the entire section j of the travelling route and the evaluation pattern v_test_k until completing the entire section k.

Sine the horizontal axis of FIG. 11(A) is time axis, the horizontal axis is converted to be a distance axis as shown in FIG. 11(B), thereby causing the data to fit the distance Li, Lj and Lk of the sections i, j and k. As shown in FIG. 11(C), the process calculates an inclination information of the sections i, j and k based on altitudes of positional coordinates when travelling on the sections i, j and k with the generated vehicle speed pattern. The information of the altitudes of positional coordinates is stored in the route information storing unit 202. The information of altitudes of the positional coordinates may be acquired from a service organization that provides this information.

Since the calculation process performed by the energy prediction unit 105 after generating the vehicle speed patterns is the same as those described with reference to FIGS. 5 to 8, explanation thereof will be omitted.

In the above-description, a case is described in which the traffic information corresponding to the evaluation pattern v_test is the average vehicle speed v_ave. As described above, the traffic information is not limited to the average vehicle speed, but may include characteristic information of a vehicle speed on the route, characteristic information of a traffic flow on the route, characteristic information on the route, characteristic information of an area surrounding the route, characteristic information of the destination and characteristic information of the weather on the route.

The characteristic information of the vehicle speed on the route includes an average vehicle speed, an average frequency of accelerations and decelerations and an average number of times of vehicle stops. The characteristic information of the traffic flow on the route includes a traffic-flow quantity and a legal speed. The characteristic information of the route includes information such as the number of signals on the route, the number of temporally stops on the route, an average number of traffic lanes on the route, the number of railroad-crossings on the route, the number of left and right turns on the road, information of a lane regulation and under-construction on the road, an inclination angle on the route and a curvature of a curved road on the route.

The characteristic information of an area surrounding the route includes information about popular shops existing in an area surrounding the route, information about schools existing in an area surrounding the route, an average age of drivers living in an area surrounding the route, the number of commuters living in an area surrounding the route and information of whether the surrounding area of the route is a business district or a satellite town for commuters. The characteristic information about the destination includes the number of delivery points when requiring a parcel delivery and bus-stops included in the route.

Figure 12:
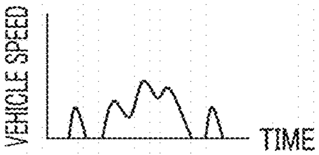
FIG. 12 a table showing an example of a relationship between an average vehicle speed and an evaluation pattern.
Figure 12:
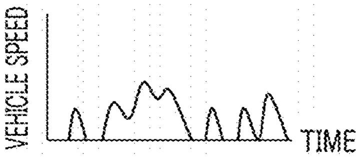
Figure 12:
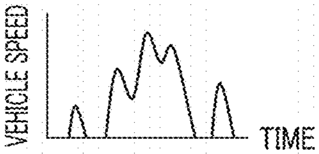
Figure 12:
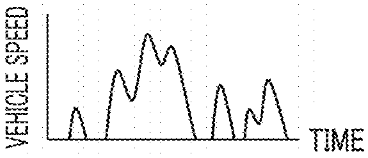

As exemplified in FIG. 12, the evaluation pattern v_test may be stored corresponding to the number of average vehicle speed and the number of signals. When the average vehicle speed v_ave is 'v0' and the number of signals is 'to 10', 'S0' is selected for the evaluation pattern v_test.

APPENDIX

The following appendixes 1 to 3 can be arbitrarily combined as long as no technical inconsistency is present.

APPENDIX 1

An energy prediction apparatus (10) comprising:

- a pattern storing unit (204) that stores a plurality of vehicle speed patterns as an evaluation pattern, corresponding to an evaluation-purpose traffic information as information related to a traffic where a vehicle travels;
- a route acquiring unit (102) that acquires a travelling route where an object vehicle travels for which energy consumption is to be predicted;
- an information acquiring unit (103) that acquires an object traffic information related to traffic where the object vehicle travels on the travelling route;
- a pattern acquiring unit (104) that acquires an evaluation pattern corresponding to the object traffic information from the plurality of evaluation patterns stored in the pattern storing unit (204); and
- an energy prediction unit (105) that predicts an energy consumption where the object vehicle travels on the travelling route using the evaluation pattern acquired by the pattern acquiring unit (104).

According to the appendix 1, since the evaluation pattern corresponding to the object traffic information as the information related to a traffic where the object vehicle travels on the travelling route is acquired, a vehicle speed pattern depending on the traffic state of the travelling route can be selected, whereby an accuracy for predicting the energy consumption can be improved. The evaluation pattern stored in advance is used to generate a vehicle speed pattern on the travelling route to predict the energy consumption. Hence, it can be effectively calculated while improving the accuracy for predicting the energy consumption and the calculation speed can be higher.

According to the description for the present embodiment, when generating the vehicle speed pattern on the travelling route using the evaluation pattern, an example is described in which the evaluation pattern is repeated until completing the entire travelling route. Further, it is exemplified that the horizontal axis is converted to be a distance axis since the horizontal line of the evaluation pattern is time axis, whereby the data is caused to be fitted to the distance of the travelling route. However, the method for generating the vehicle speed pattern on the travelling route using the evaluation pattern is not limited to the above method. For example, when the evaluation pattern corresponds to a sufficiently long period, the evaluation pattern may not be repeated but a part of the evaluation pattern may be used for the vehicle speed pattern on the travelling route. For example, an evaluation pattern may be prepared in advance in which the horizontal axis is a distance axis.

APPENDIX 2

The energy prediction apparatus (10) according to appendix 1, wherein

- the route acquiring unit (102) divides the travelling road into a plurality of sections;
- the information acquiring unit (104) acquires the object traffic information for each section; the pattern acquiring unit acquires the evaluation pattern corresponding to the object traffic information for each section; and
- the energy prediction unit (105) predicts an energy consumption where the object vehicle travels on the traveling route using the evaluation pattern for each section.

According to the appendix 2, the travelling road is divided into a plurality of sections, the object traffic information for each section is acquired to select the evaluation pattern, and the evaluation pattern for each section is used to predict the energy consumption. Hence, an accuracy for predicting the energy consumption can be improved. Also with appendix 2, the evaluation pattern stored in advance is used to generate the vehicle speed pattern on the travelling route and the energy consumption is predicted. Therefore, it can be effectively calculated while improving the accuracy for predicting the energy consumption and the calculation speed can be higher.

APPENDIX 3

The energy prediction apparatus according to appendix 1 or 2, wherein the evaluation traffic information and the object traffic information include at least one of characteristic information of the vehicle speed, characteristic information of a traffic flow, characteristic information on the route, characteristic information of an area surrounding the route, characteristic information of a destination and characteristic information of weather.

As described, the present embodiment is described with reference to specific examples. However, the present disclosure is not limited to these specific examples. For these specific examples, a person of ordinary skill in the art may appropriately modify the design thereof. These modified designs are included in the scope of the present disclosure as long as features of the present disclosure are provided therein. Further, respective elements included in the above-described specific examples, arrangements, conditions and shapes thereof are not limited to the above-exemplified elements and may be appropriately modified. The respective elements in the above-described specific examples may be appropriately combined as long as no technical inconsistency is present.

The energy prediction apparatus and method thereof disclosed in the present disclosure may be accomplished by a dedicated computer constituted of a processor and a memory programmed to execute one or more functions embodied by computer programs. Alternatively, the energy prediction apparatus and method thereof disclosed in the present disclosure may be accomplished by a dedicated computer provided by a processor configured of one or more dedicated hardware logic circuits. Further, the energy prediction apparatus and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

CONCLUSION

The present disclosure provides an energy prediction apparatus including a pattern prediction unit (204) that stores a plurality of vehicle speed patterns as an evaluation pattern, corresponding to an evaluation-purpose traffic information as information related to a traffic where a vehicle travels; a route acquiring unit (102) that acquires a travelling route. where an object vehicle travels for which energy consumption is to be predicted; an information acquiring unit (103) that acquires an object traffic information related to a traffic where the object vehicle travels on the travelling route; a pattern acquiring unit (104) that acquires an evaluation pattern corresponding to the object traffic information from the plurality of evaluation patterns stored in the pattern storing unit; and an energy prediction unit (105) that predicts an energy consumption where the object vehicle travels on the travelling route using the evaluation pattern acquired by the pattern acquiring unit.

According to the present disclosure, an accuracy for predicting an energy consumption where a vehicle travels on a route can be improved.

What is claimed is:

1. A method for predicting an energy consumption executed by a computer comprising:

storing in a memory vehicle characteristics information including a gross vehicle weight, an air resistant coefficient, a frontal projected area and a rolling resistance coefficient of a vehicle;

storing in the memory a plurality of vehicle speed patterns, as an evaluation pattern, corresponding to evaluation-purpose traffic information as information related to a traffic where the vehicle travels;

setting a travelling route where the vehicle travels for which energy consumption is to be predicted;

retrieving object traffic information related to traffic where the vehicle travels on the travelling route;

retrieving an evaluation pattern corresponding to the object traffic information from a plurality of evaluation patterns stored in the memory;

using the retrieved evaluation pattern to generate a generated vehicle speed pattern;

predicting the energy consumption of the vehicle when travelling along the travelling route using the retrieved evaluation pattern and the stored vehicle characteristics information;

determining whether the travelling route is complete; and in response to determining that the travelling route is not complete, repeating the use of the evaluation pattern to generate the vehicle speed pattern and predict the energy consumption until the set travelling route is completed.

2. A non-transitory computer-readable storage medium storing computer-readable instructions for causing a computer to execute a method for predicting an energy consumption, the method comprising:

storing in a memory vehicle characteristics information including a gross vehicle weight, an air resistant coefficient, a frontal projected area and a rolling resistance coefficient of a vehicle;

storing in the memory a plurality of vehicle speed patterns as an evaluation pattern, corresponding to evaluation-purpose traffic information as information related to a traffic where the vehicle travels;

setting a travelling route where the vehicle travels for which energy consumption is to be predicted;

retrieving object traffic information related to traffic where the vehicle travels on the travelling route;

retrieving an evaluation pattern corresponding to the object traffic information from a plurality of the evaluation patterns stored in the memory;

using the retrieved evaluation pattern to generate a generated vehicle speed pattern;

predicting the energy consumption of the vehicle when travelling along the travelling route using the retrieved evaluation pattern and the stored vehicle characteristics information;

determining whether the travelling route is complete; and in response to determining that the travelling route is not complete, repeating the use of the evaluation pattern to generate the vehicle speed pattern and predict the energy consumption until the set travelling route is completed.

3. An energy prediction apparatus comprising:

a memory configured to store:

vehicle characteristics information including a gross vehicle weight, an air resistant coefficient, a frontal projected area and a rolling resistance coefficient of a vehicle; and a plurality of vehicle speed patterns, as an evaluation pattern, corresponding to evaluation-purpose traffic information as information related to traffic where the vehicle travels; and a processor configured to:

set a travelling route where the vehicle travels for which energy consumption is to be predicted;

retrieve object traffic information related to traffic where the vehicle travels on the travelling route;

retrieve an evaluation pattern corresponding to the object traffic information from a plurality of evaluation patterns stored in the memory;

use the retrieved evaluation pattern to generate a generated vehicle speed pattern;

predict the energy consumption of the vehicle when travelling along the travelling route using the retrieved evaluation pattern and the vehicle characteristics information;

determine whether the travelling route is complete; and in response to determining that the travelling route is not complete, repeat the use of the evaluation pattern to generate the vehicle speed pattern and predict the energy consumption until the set travelling route is completed.

4. The energy prediction apparatus according to claim 3, wherein the processor is further configured to:

divide a travelling road into a plurality of sections;

retrieve the object traffic information for each section of the plurality of sections;

retrieve the evaluation pattern corresponding to the object traffic information for each section; and predict an energy consumption where the vehicle travels on the traveling route using the evaluation pattern for each section.

5. The energy prediction apparatus according to claim 3, wherein the evaluation-purpose traffic information and the object traffic information include at least one of characteristic information of the vehicle speed, characteristic information of a traffic flow, characteristic information on the route, characteristic information of an area surrounding the route, characteristic information of a destination and characteristic information of weather.

* * * * *